March 25, 1924.

P. ARRIGHI

ROTARY GAS ENGINE

Filed Sept. 29, 1920   4 Sheets-Sheet 1

1,487,829

INVENTOR.
PIETRO ARRIGHI
BY Chas. E. Townsend
ATTORNEY

March 25, 1924.

P. ARRIGHI

ROTARY GAS ENGINE

Filed Sept. 29, 1920  4 Sheets-Sheet 2

1,487,829

INVENTOR.
PIETRO ARRIGHI

Chas. E. Townsend
ATTORNEY

March 25, 1924.

P. ARRIGHI 1,487,829

ROTARY GAS ENGINE

Filed Sept. 29, 1920    4 Sheets-Sheet 3

INVENTOR.
PIETRO ARRIGHI
BY Chas. E. Townsend
ATTORNEY

March 25, 1924.  1,487,829
P. ARRIGHI
ROTARY GAS ENGINE
Filed Sept. 29, 1920  4 Sheets-Sheet 4

INVENTOR.
PIETRO ARRIGHI
BY Chas. E. Townsend
ATTORNEY

Patented Mar. 25, 1924.

1,487,829

UNITED STATES PATENT OFFICE.

PIETRO ARRIGHI, OF SAN FRANCISCO, CALIFORNIA.

ROTARY GAS ENGINE.

Application filed September 29, 1920. Serial No. 413,585.

*To all whom it may concern:*

Be it known that I, PIETRO ARRIGHI, a citizen of the United States, residing at the city and county of San Francisco and State of California, have invented a new and useful Improvement in Rotary Gas Engines, of which the following is a specification.

This invention relates to a gas engine and especially to an engine of the rotary type.

One of the objects of the present invention is to provide a simple compact internal combustion engine of the rotary type which is so constructed that one or more cylinders may be arranged in alignment and the power produced transmitted to a common main shaft.

Another object of the invention is to provide a pair of pistons for each cylinder, said pistons being of the vane type and directly supported by the main shaft; one piston being fixed or keyed to the shaft so as to rotate in unison therewith, while the other piston is mounted for oscillation upon the shaft while rotating therewith.

Another object of the invention is to provide a crank shaft supported by the fixed piston and a connecting rod connection between the second named piston and the crank shaft whereby an oscillating movement is transmitted thereto; further to provide a pair of fixed gears and a pair of pinions intermeshing therewith; said pinions being secured to the crank shaft to transmit a rotary movement thereto.

Another object of the invention is to provide a novel valve arrangement whereby the intake and exhaust of the engine is regulated and four-cycle operation permitted; further to so time the movement of the pistons and valves that two explosions will be obtained during each revolution of the fixed piston and the main shaft.

Further objects will hereinafter appear.

The invention consists of the parts and the construction, combination and arrangement of parts as hereinafter more fully described and claimed, having reference to the accompanying drawings, in which—

Figure 1:
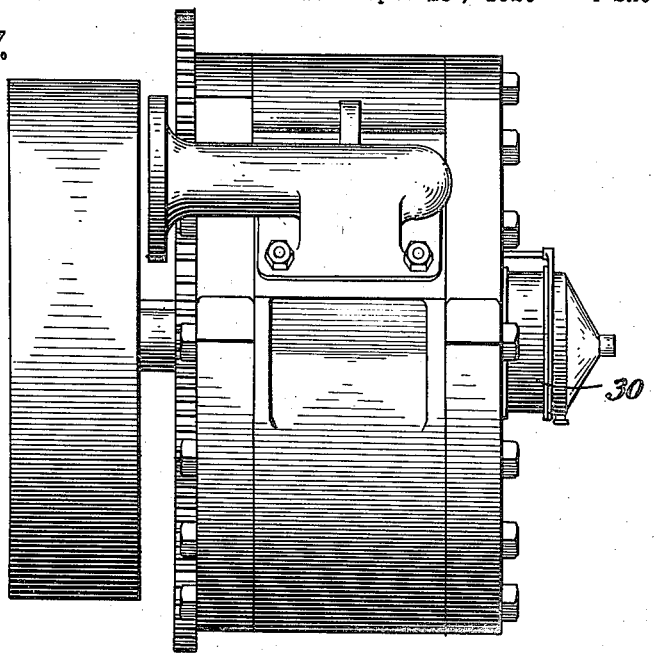
Fig. 1 is a side elevation of the engine.
Figure 6:
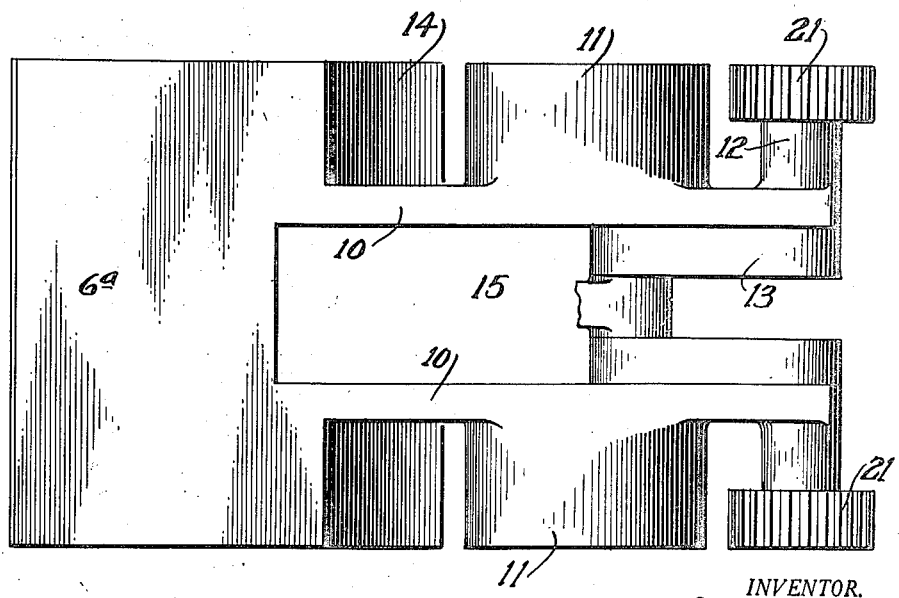
Fig. 6 is an end view of the same.
Figure 7:
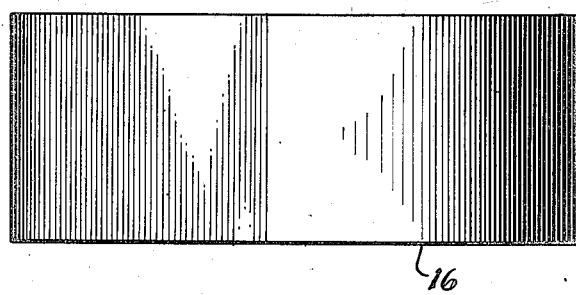
Fig. 7 is an end view of the oscillating piston.
Figure 8:
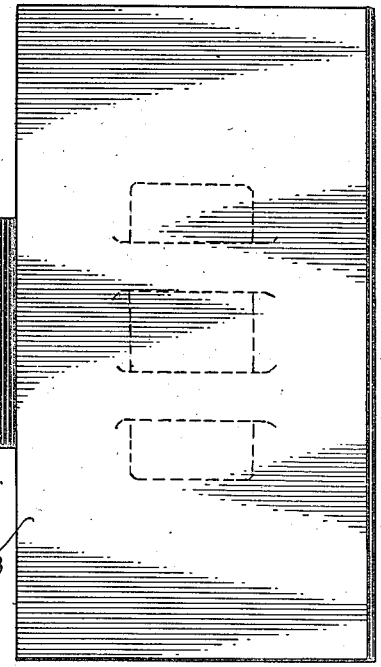
Fig. 8 is a side elevation of the same.
Figure 8:
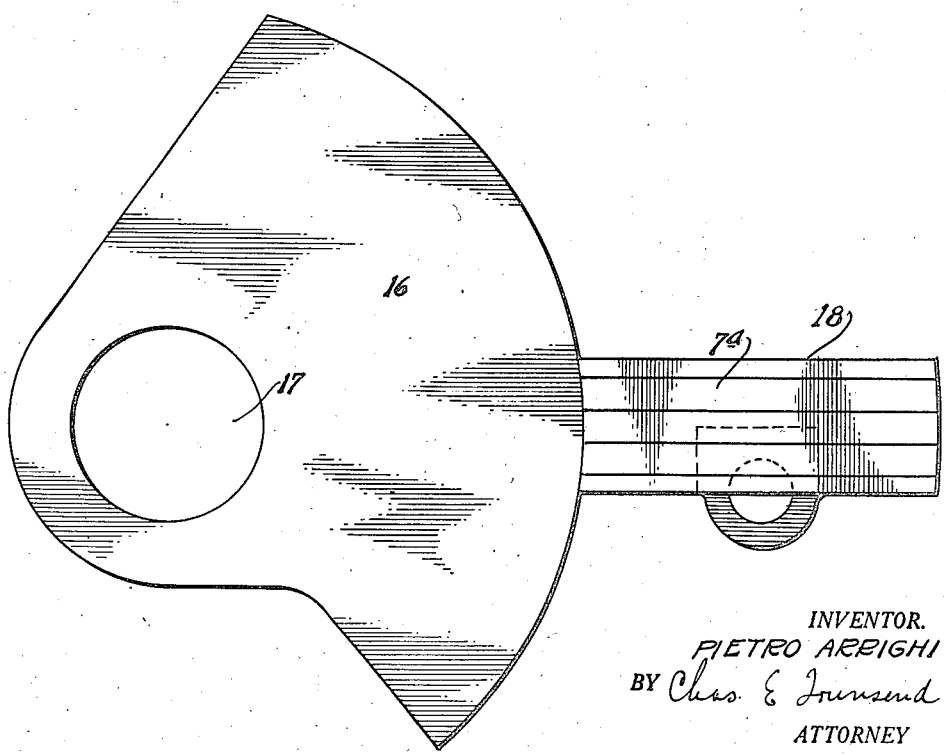

Referring to the drawings in detail, A indicates a cylinder and 2 and 3 a pair of heads enclosing the same. The cylinder and the heads are water jacketed in this instance, but may be designed for air cooling if desired. Extending through the cylinder and the head members 2 and 3 is a main shaft B. This shaft is journalled in bearing members formed in the heads 2 and 3, respectively, and it serves two functions, first, that of supporting a fly-wheel 4 and a timing gear 5, and secondly that of supporting a pair of pistons 6 and 7. The pistons 6 and 7 are supported directly by the main shaft B and are of course positioned within the cylinder between the head members 2 and 3. The piston 6 is fixed with relation to the main shaft B as it is keyed thereto as indicated at 8. The piston 7 is also directly supported by the main shaft, but is freely turnable thereon, that is an oscillating movement is transmitted to the piston 7 during the rotation of the fixed piston and the main shaft and this is accomplished in the following manner:

The fixed piston consists of a main vane $6^a$, the outer face and sides of which carry piston rings 9. The piston otherwise consists of a pair of substantially sector shaped side plates 10 on which are fixed bearing hubs 11, which support the piston with relation to the main shaft; the hubs being keyed to the shaft as illustrated at 8. The side plates are also provided with a pair of bearing members 12, in which is journalled a crank shaft 13, and it is further provided with a pair of segmental flanges 14 which are formed integral with the side plates 10 and the piston vane $6^a$. The side plates 10 are interspaced to form a pocket 15, (see Fig. 6) for the reception of a substantially sector shaped main supporting plate 16 of the piston 7. This plate forms a bearing for said piston as the main shaft extends therethrough as indicated at 17, (see Fig. 8,) and it also serves as a support for a piston vane $7^a$, which is practically identical in construction with the piston vane $6^a$, that is the sides and outer ends are provided with rings 18 to reduce gas leakage to a minimum. The width of the piston vanes $6^a$ and $7^a$ are equal to the spacing between the cylinder heads 2 and 3.

The width of the segmental flanges 14 on the fixed piston is similar, but the width of the plate 16 is equal to the space formed between the side plates 10 on the fixed piston. The plate 16 will therefore enter the space 15 formed between the side plates 10 and one piston will be guided with relation to the other and a gas tight joint will also be formed as will hereinafter be described. The main piston 6 as previously stated is fixed to the main shaft and therefore rotates in unison with the same, while the piston 7 is freely mounted on the shaft and is therefore movable independent of the same.

Figure 2:
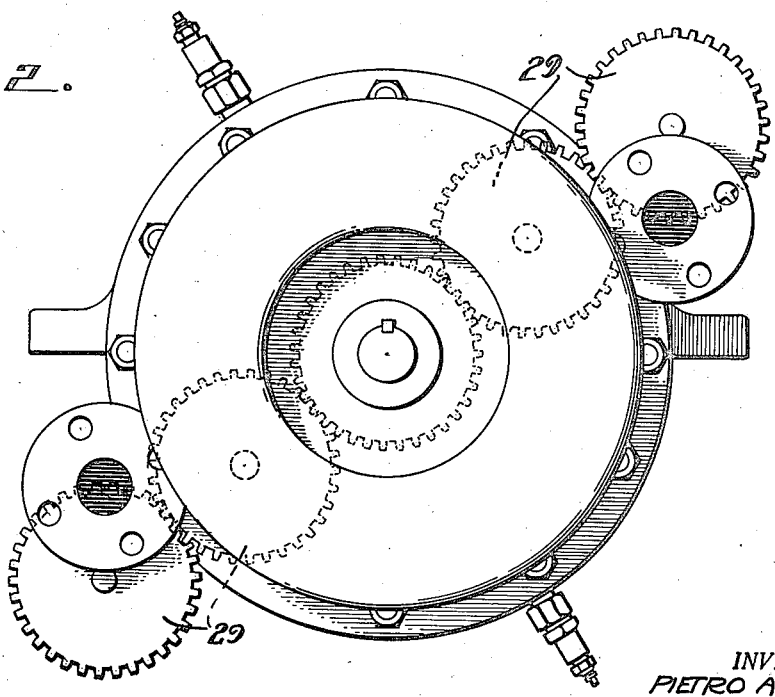
Fig. 2 is an end view of the same.

In actual practice an oscillating movement is transmitted to the piston through the medium of the crank shaft 13 and a connecting rod 19 which is attached to the rear side of the piston 7 as indicated at 20, and rotary movement is in turn transmitted to the crank shaft through means of a pair of pinions 21 secured thereon which intermesh with a pair of stationary gears 22 secured to the respective cylinder heads 2 and 3 as indicated at 23. The gear ratio employed is four to one, that is the pinions 21 will make four complete revolutions while the main piston is making one complete revolution about the stationary gears 22. Eight oscillations will in this manner be transmitted to the piston 7 and it is therefore possible to obtain four-cycle action and simultaneously obtain two explosions during each revolution of the main shaft. With this object in view I have provided two opposed exhaust ports 24, two opposed inlet valves 25 and two opposed spark plugs 26. The exhaust ports are formed by coring the cylinder and they are automatically covered or uncovered by the movement of the pistons, thus eliminating the use of valves at these points. The intake ports are also cored in the cylinder, but valves as indicated at 25 are employed. These valves are supported in cages 27 screwed into or otherwise secured with relation to the cylinder. Each valve is mechanically actuated by a cam 28. These are in turn operated from the main shaft by gear trains indicated at 29 (see Fig. 2,) which are driven by the timing gear 5. The gear ratio is one to one as each inlet valve is opened and closed once during each revolution of the pistons. The distributor indicated at 30 is secured directly on the outer end of the main shaft and closes the circuit through each spark plug once during each revolution; no gearing being required in this instance as two explosions take place during each revolution.

Figure 3:
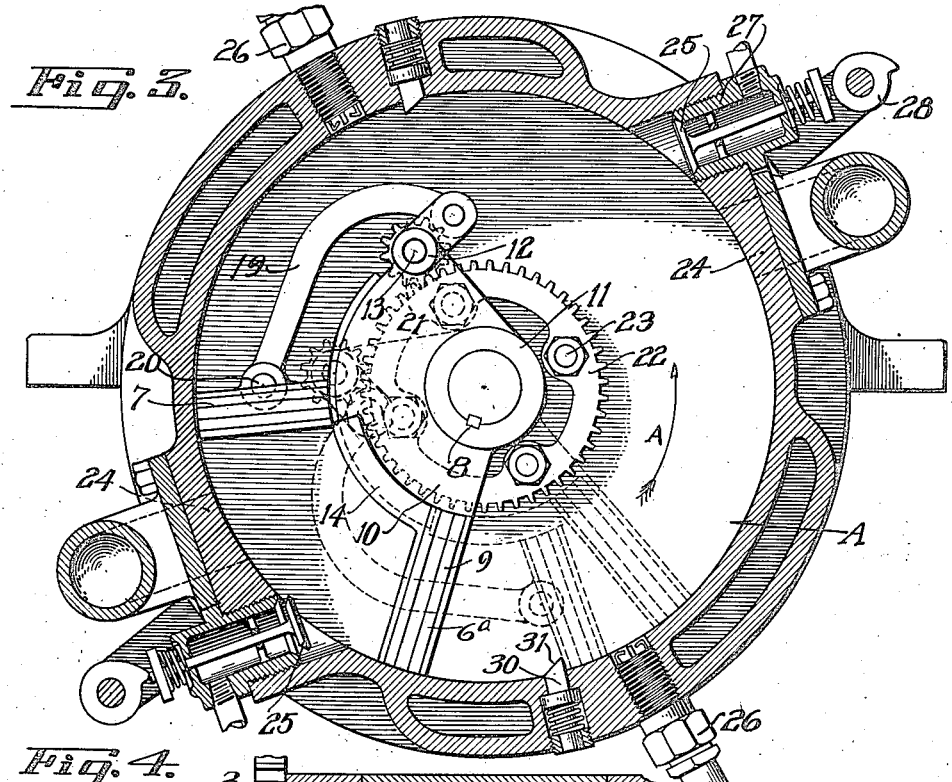
Fig. 3 is an enlarged central vertical cross section.
Figure 4:
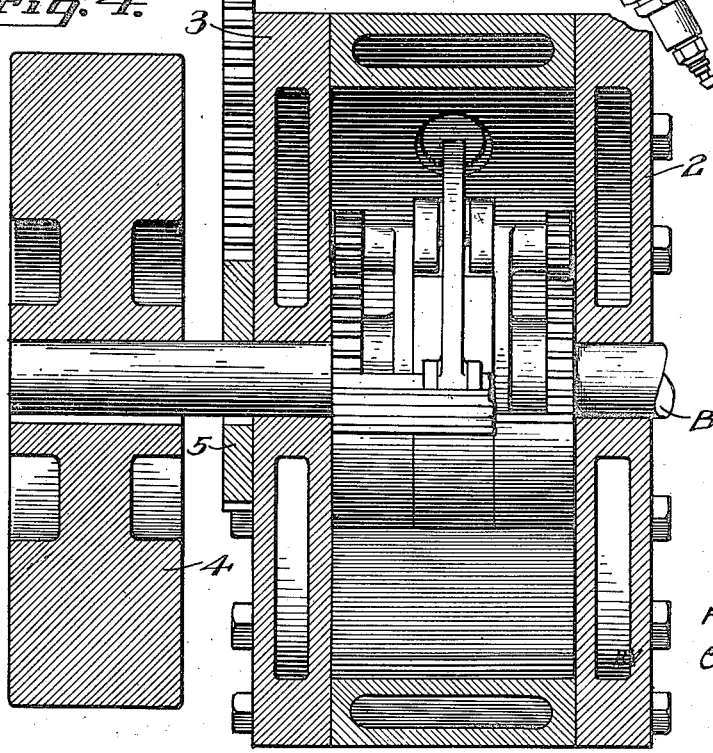
Fig. 4 is a central vertical longitudinal section with parts broken away.
Figure 5:
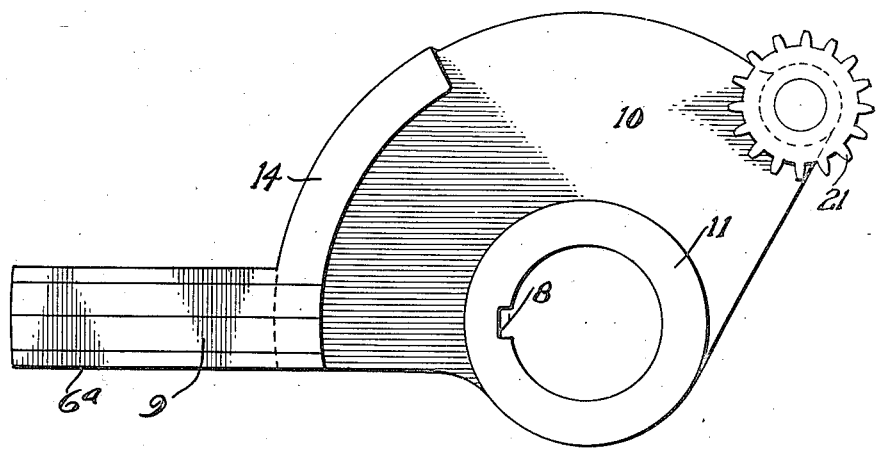
Fig. 5 is a side elevation of the fixed piston.

In actual operation we will suppose that the pistons assume the full line position shown in Fig. 3; oscillating piston 7 has moved rearwardly with relation to the main piston 6, and the inlet valve 25 has been opened by its actuating cam; a suction was produced during the rearward movement of the piston 7 and an explosive mixture was therefore admitted. Further revolution of the main shaft and the piston 6 until the point indicated by dotted lines is reached, will cause the oscillating piston to move forward and thereby compress the explosive charge between the pistons. The two pistons now register with the spark plug 26 and a circuit is closed through the plug so that the charge is ignited. The force of the explosion is exerted on the main piston 6 and this will continue to travel in the direction of arrow $a$. The explosive mixture will thus expand and the piston 6 will reach the point where it uncovers or passes beyond the exhaust ports 24. The burnt charge under slight pressure will thus escape and will be completely removed by forward movement of the oscillating piston. The continued revolution of the pistons causes the main piston 6 to pass beyond the second inlet valve 25 and simultaneously rearward movement to be transmitted to the oscillating piston. The second inlet valve 25 is now opened and a new explosive charge is admitted between the pistons; this charge being compressed by forward movement of the oscillating piston. Complete forward movement and maximum compression is reached by the time register is made with the second spark plug 26 and it is here ignited and permitted to expand or exert its force on the main piston 6.

From the foregoing it can be seen that four-cycle movement is transmitted; further that the eight oscillating movements transmitted to the oscillating piston 7 permits the introduction of two separate explosive charges, separate ignition of said charges, and separate scavenging of the same, hence the provision of the proposed inlet valve, exhaust ports and spark plugs.

In actual practice with both pistons rotating in the direction of arrow A, it is obvious that the main piston rotates with a constant speed as it is secured to the main shaft B; further that the piston 7 must follow the main piston as it is connected therewith through the medium of the rod 19 and the crank shaft 13. An oscillating movement is however transmitted thereto as the crank shaft makes four complete revolutions during one revolution of the main shaft; this being due to the fact that the pinions 21 remain in constant mesh with the stationary gears 22. By referring to Fig. 3 it will be seen that a latch 30 is disposed adjacent each spark plug. The forward face of each latch is cam-shaped as at 31 to permit the pistons when passing by to depress the same. These latches are provided as back stops for the oscillating piston 7, that is the pistons might rotate in either direction if the back stops or latches 30 were not provided. In other words these latches prevent reverse movement of the pistons and insure forward movement in the direction of arrow A at all times. The dotted line position of the pistons shown in Fig. 3, where they register with the spark plug 26, readily illustrates the function of the latch 30. If an explosion takes place at this point, it should be obvious that the main piston will travel in the direction of arrow A as the oscillating piston is held against rearward movement by the latch, and it may here be stated that it practically remains stationary and in engagement with the latch while the main piston is moving forward due to the expansive force of the burning charge. After the forward movement of the main piston has taken place the crank shaft will force the oscillating piston forwardly and complete exhaust or scavenging of the charge will then take place. Sufficient momentum is produced during this forward movement of the two pistons to prevent reverse movement during the suction and compression stroke and the second latch is passed or registered with before the next explosion takes place.

By referring to Figs. 5, 6, 7 and 8, it will be seen that the oscillating piston 7 passes over the segmental flanges 14 during its oscillating movement, and that the forward portion of the plate 16 passes between the side plates 10 of the main piston 6. This is important as it provides a series of snugly fitted surfaces through which gas losses by leakage are reduced to a minimum.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. An internal combustion engine comprising a casing having a cylinder chamber formed therein, a cylinder head on each end of the casing forming a closure for the respective ends of the cylinder chamber, a main shaft extending directly through the cylinder chamber and journaled in the head members, a main piston mounted on the shaft and comprising a transverse vane and spaced substantially sector shaped side plates forming a space between them, a second piston composed of a transverse vane, and a main substantially sector shaped supporting plate mounted on the shaft and fitted in the space between the said side plates, said vanes and plates cooperating with the casing to form a case tight combustion chamber, and means carried by the first named piston for transmitting an oscillatory movement to the second named piston.

2. An internal combustion engine comprising a casing having a cylinder chamber formed therein, a cylinder head on each end of the casing forming a closure for the respective ends of the cylinder chamber, a main shaft extending directly through the cylinder chamber and journaled in the head members, a piston comprising spaced substantially sector shaped side plates forming a space, a transverse vane carried by the side plates and segmental flanges extending from the transverse piston at the peripheries of the side plates, a second piston composed of a vane, and a main substantially sector shaped supporting plate mounted on the shaft and arranged in the said space and having its peripheral edge coinciding with the peripheral edges of the said side plates, and means carried by the first named piston for transmitting oscillatory movement to the second piston.

3. An internal combustion engine comprising a casing having a cylinder chamber formed therein, a cylinder head on each end of the casing forming a closure for the respective ends of the cylinder chamber, a main shaft extending directly through the cylinder chamber and journaled in the head members, a piston comprising spaced substantially sector shaped plates mounted on the said shaft and provided with laterally projecting bearing members spaced from the shaft, a transverse vane connecting the side plates and segmental flanges located at the upper faces of the side plates and extending from the said vane, a second piston comprising a substantially sector shaped supporting plate mounted on the shaft between the said side plates and having its periphery coinciding with the peripheries of the said side plates, a pair of stationary gears secured to the cylinder heads, a crank shaft mounted in the said bearing members and provided with pinions meshing with the said stationary gears, and a connecting rod connecting the crank shaft with the second piston.

In testimony whereof I have hereunto set my hand in the presence of two subscribing witnesses.

PIETRO ARRIGHI.

Witnesses:
  W. W. HEALEY,
  HENRY ARRIGHI.